US010393957B1

(12) United States Patent
Potter

(10) Patent No.: US 10,393,957 B1
(45) Date of Patent: Aug. 27, 2019

(54) GLUED OPTICAL FIBER BUNDLE

(71) Applicant: Valeo North America, Inc., Troy, MI (US)

(72) Inventor: Brant Potter, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 16/038,999

(22) Filed: Jul. 18, 2018

(51) Int. Cl.
*G02B 6/04* (2006.01)
*G02B 6/42* (2006.01)
*G02B 6/38* (2006.01)

(52) U.S. Cl.
CPC .............. *G02B 6/04* (2013.01); *G02B 6/4212* (2013.01); *G02B 6/3885* (2013.01)

(58) Field of Classification Search
CPC ... G02B 6/04; G02B 6/06; G02B 6/08; G02B 6/4212
USPC ............... 385/31, 38, 80, 115, 116, 117, 120
See application file for complete search history.

(56) References Cited

U.S. PATENT DOCUMENTS

| 5,953,477 A * | 9/1999 | Wach | A61B 5/14546 385/115 |
| 7,263,261 B2 * | 8/2007 | Henze | C03C 25/104 385/115 |
| 9,927,087 B1 | 3/2018 | Greene et al. | |
| 2003/0002296 A1 | 1/2003 | Steiner et al. | |
| 2008/0019659 A1 * | 1/2008 | Tao | G02B 6/001 385/147 |
| 2018/0017227 A1 | 1/2018 | Greene et al. | |
| 2018/0294616 A1 * | 10/2018 | Lin | H01S 3/0675 |
| 2019/0033506 A1 * | 1/2019 | Weber | G02B 6/0006 |

FOREIGN PATENT DOCUMENTS

| DE | 39 40 642 A1 | | 6/1991 | |
| EP | 0 181 805 A1 | | 10/1985 | |
| GB | 1151558 | | 5/1969 | |
| GB | 1 306 420 | | 2/1973 | |
| JP | 55-124109 | * | 9/1980 | ............... G02B 5/16 |
| JP | 1-281408 | * | 11/1989 | ............... G02B 6/04 |
| JP | 2006-227203 | * | 8/2006 | ............... G02B 6/04 |
| WO | WO 2016/204779 A1 | * | 12/2016 | ............... F21S 8/10 |

\* cited by examiner

Primary Examiner — Robert Tavlykaev
(74) Attorney, Agent, or Firm — Oblon, McClelland, Maier & Neustadt, L.L.P.

(57) ABSTRACT

An optical fiber light emitting diode assembly is disclosed. The assembly includes an array of optical fibers that converge to a bundled portion at each end, each optical fiber having a core surrounded by a transparent cladding material with a lower index of refraction than the core. A first adhesive binds the optical fibers in the bundled portion at each end, an end of the first adhesive being adjacent to the end of the optical fibers. A second adhesive, having a different refractive index than the first adhesive, is applied to the end of the optical fibers and the end of the first adhesive. An end part is mounted to the second adhesive. A light emitting diode applies light into the end part through an air gap.

9 Claims, 7 Drawing Sheets

FIG. 1
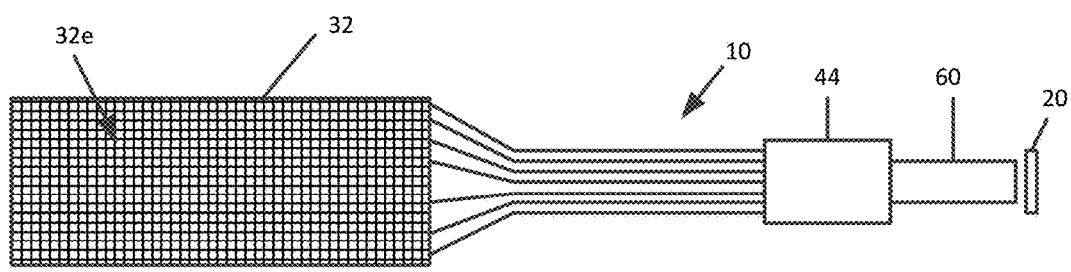
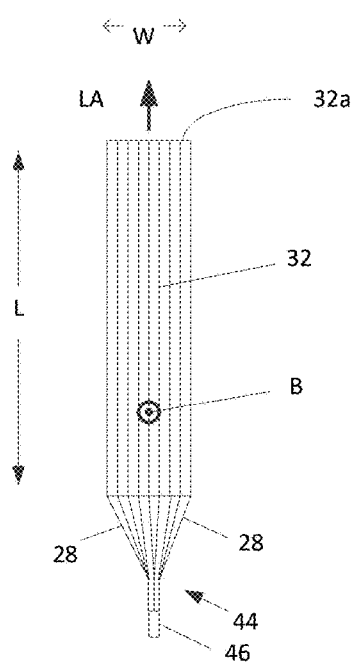
FIG. 2

GLUED OPTICAL FIBER BUNDLE

CROSS-REFERENCE TO RELATED APPLICATIONS

This application is related to U.S. Application Publication No. 2018/0017227 published Jan. 18, 2018, and U.S. Pat. No. 9,927,087, issued Mar. 27, 2018, the entire contents of which are incorporated herein by reference.

BACKGROUND

Field of Disclosure

The present disclosure relates generally to gluing an optical fiber bundle, for example, in a fiber LED in a vehicle.

Description of the Related Art

Vehicles contain various types of lighting devices. Exterior vehicle lighting devices may include a stop light, tail light, head lamp, daytime running light, fog light, turn signal lights, and other signaling lights. Interior vehicle lighting devices may include cabin lighting.

Vehicles are being incorporated with light-emitting diodes (LED) as a lighting source. The LED lighting devices may include optics for guiding light, such as light guide and optical fiber. LED lighting devices combined with optics for guiding light may be formed as a fiber panel LED.

Optical fiber is generally composed of a cladding, a core, and an outer buffer. The outer buffer protects the fiber from the outside environment including extraneous light signals, i.e. interference. Optical fiber generally transmits light by way of total internal reflection (TIR) from an input end to an output end of the fiber. Total internal reflection is accomplished by a core made of a material of one refractive index and an outer transparent cladding made of a material having a refractive index that is higher or lower than the core refractive index. In particular, light travels through the core by constantly reflecting from the cladding because the angle of the light is always greater than a critical angle. The critical angle is a particular angle in which the refracted light will not go into the cladding, but will instead travel along the surface between the cladding and the core.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic view of a fiber optic light panel device according to an exemplary aspect of the disclosure;

FIG. 2 is a planar view of a fiber optic light panel used in a lighting device according to an exemplary aspect of the disclosure;

DETAILED DESCRIPTION

Figure 3:
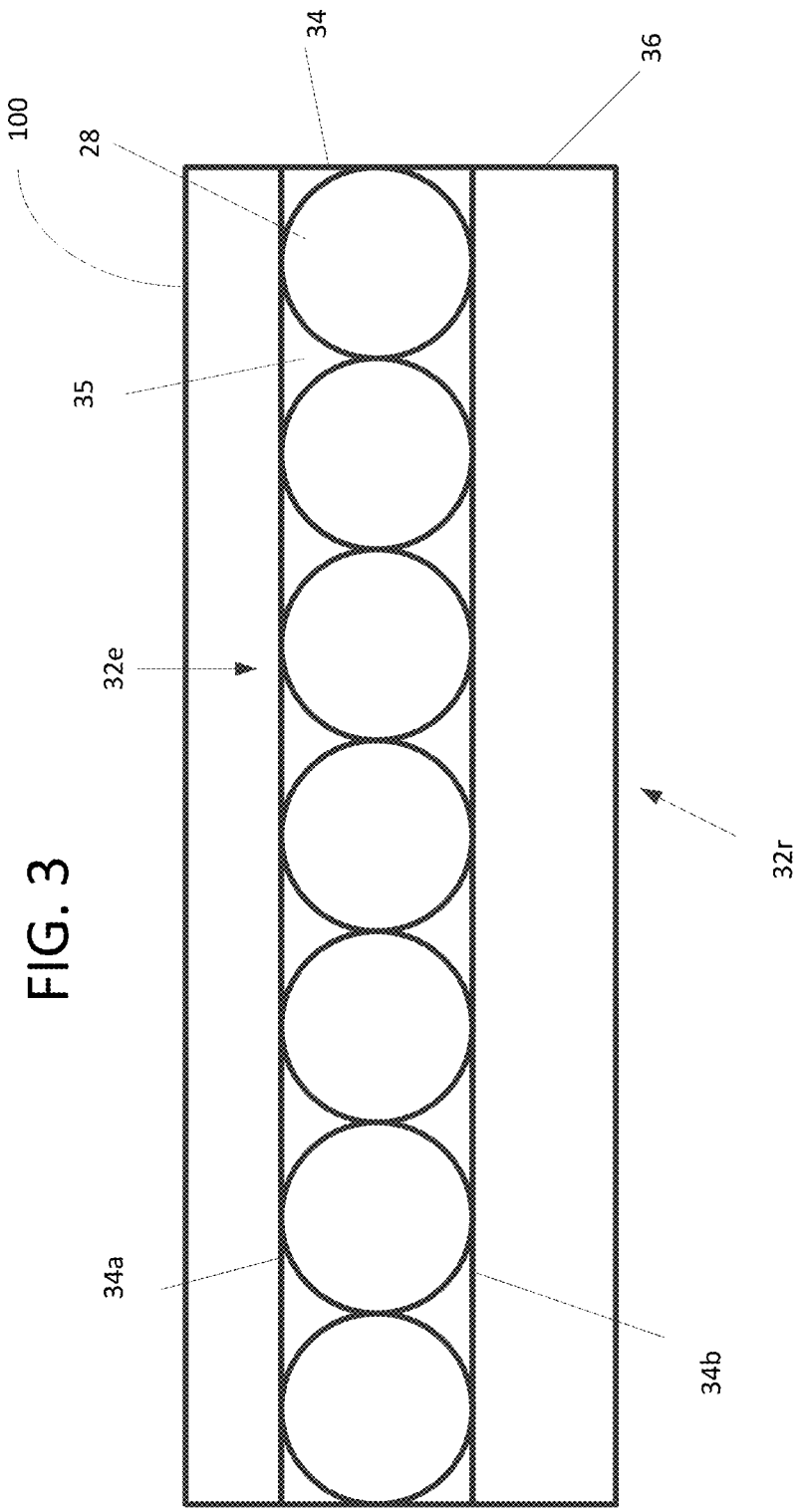
FIG. 3 is a schematic view of a cross-section of the light panel device in FIG. 1.

Referring now to the drawings, wherein like reference numerals designate identical or corresponding parts throughout several views, the following description relates to a fiber optic light panel device in which bundled optical fibers are glued to each other and to an end piece.

A fiber optic light panel assembly generally includes a light source that inputs light to a fiber bundle having fibers extending therefrom to form a light panel. At least an end portion of the fiber bundle may be held together. For example, optical fibers may be held together by adhesive to bond the fibers together. Alternatively, the fiber bundle may be maintained by a coupling (such as a ferrule). The bundle may also include a wrap, sleeve, adhesive, tape, resin or the like to facilitate holding the fibers in the bundled position.

U.S. patent application serial no. PCT/US 2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

U.S. patent application serial no. US 2018/0017227 titled Fiber Optic Light Panel with Homogeneous Light Output, filed on Jul. 14, 2016 by the same applicant as the present application, discloses an optical mixer for a vehicle lighting device having a light source and an optical fiber panel. The fiber optic light panel assembly generally includes a light source that inputs light to a fiber bundle having fibers extending therefrom to form a light panel. The patent application notes that such fiber optic panels may have an uneven light output intensity across the area of the panel, which is undesirable aesthetically. In particular, the homogeneity of the fiber optic panel light output is inferior to that of Organic Light Emitting Diodes (OLEDs). The patent application further notes that this problem of uneven light output of fiber optic panels, known as "streaking," becomes more noticeable at higher light outputs of the fiber optic light panel. In particular, it has been determined that the streaking problem of fiber optic light panel devices is closely related to spatial intensity variations in the output radiation pattern of the light source itself. In particular, it has been determined that higher power light sources often needed to satisfy light output requirements for vehicle lighting tend to have greater spatial intensity variation, which causes homogeneity at the light panel output to worsen.

The approach to improving homogeneity of light from a light source into a fiber bundle described in US 2018/0017227 includes an optical mixer between the light source and fiber bundle. FIG. 1 is a schematic representation of a lighting system that is described in US 2018/0017227. The lighting system 10 includes a light source 20, an optical mixer 60, a fiber bundle 44, and a fiber panel 32. The light source 20 generates light for coupling to the fiber panel 32, which emits light from a surface thereof to meet the desired lighting function. A light emitting side of the panel 32 is indicated by 32e in FIG. 1. The fiber bundle 44 groups fibers of the panel 32 in a configuration suitable for accepting light into the fiber panel 32.

The optical mixer 60 is interposed between the light source 20 and fiber bundle 44. The optical mixer 60 accepts light from the light source 20 and outputs light to the fiber bundle 44. The optical mixer 60 mixes the light, at least in part by total internal reflection, as the light travels along the mixer such that a light output from the mixer has greater spatial uniformity than that of the light source 20 light input to the optical mixer 60. In certain configurations, this arrangement can permit each fiber in the fiber bundle 44 to receive approximately the same amount of light flux input, which provides a more homogeneous light output across the fiber optic light panel 32. The optical mixer 60 may also function to shape the light output to be compatible with the fiber bundle 44.

The light source 20 may be any suitable source for generating light having photometric characteristics to provide a desired light output from panel 32. For example, the light source 20 may provide a lambertian pattern or any other radiation pattern of suitable flux, wavelength and intensity to satisfy the lighting function or aesthetic lighting effects of the panel 32. An element in the panel 32 providing for light enhancement according to the invention may alter or detract from light output characteristics of a panel 32 relative to conventional panels. According to embodiments of the invention, other optical properties of the device are modified to compensate for this reduction so that a vehicle lighting device, for example, can meet technical specifications and also provide the desired glow effect. For example, a panel having a light enhancing element may reduce the total light flux output at the panel 32, and a higher power light source is provided to compensate for this loss of efficiency.

The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2 W, 140 lm output at 2.65 v and 750 mA of current. Alternatively, a 860 mA, 6.29V, 510 lm white 1×2 LED source may be provided as light source 20. Halogen bulbs and/or an HID source may also be used.

FIG. 2 is a view of a fiber optic light panel used in a lighting system according to embodiments of the invention. The fiber optic light panel 32 includes a plurality of optical fibers 28 that extend along a length L of the panel 32, terminating at an end 32a of the panel. The fibers 28 are arranged in an array along a width W such that they define a generally planar and generally rectangular panel 32. The panel 32 may assume other arrangements and forms and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not. Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32.

It should be understood that the panel 32 may include any number of fibers 28 depending on the environment in which they are going to be used. In some of the embodiments, there are approximately fifty (50) fibers of 0.23 mm diameter per panel 32, or 100 fibers per inch width W (per layer). These are just illustrations and other numbers and sizes of fibers 28 could be used. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

A conventional optical fiber generally transmits light through total internal reflection (TIR) from an input end to an output end of the fiber. According to embodiments of the invention, the fibers 28 of the optical light panel system 10 are configured and/or arranged such that light is emitted along a length of the fibers 28 making the panel 32 illuminate in a direction that is generally not parallel with a longitudinal axis LA of the fiber, as shown by point B in FIG. 2, which represents light rays coming out of the plane of the page.

FIG. 3 is a schematic view of a cross-section of the lighting panel 32 in FIG. 1. As seen, the panel 32 is a layered structure including an optical fiber layer 34, a reflecting layer 36, and a light enhancing element 100. As seen, the panel 32 has a light emitting side 32e and a light reflecting side 32r. The optical fiber layer 34 includes a plurality of optical fibers 28 each configured to emit light along a length of the optical fiber as discussed above. The plurality of optical fibers 28 are arranged in a predetermined form such that the optical fiber layer 34 has a first side 34a facing the light emitting side 32e of the lighting panel and a second side 34b opposing the first side and facing the light reflecting side 32r of the lighting panel 32.

A reflecting layer 36 is provided on the second side 34b of the optical fiber layer 34. While shown in direct contact, one or more layers having optical properties may be interposed between the fiber layer 34 and reflecting layer 36. The reflecting layer 34 is configured to reflect light emitted along a length of the optical fibers toward the first side 34a of the optical fiber layer 32. According to embodiments of the invention, a light intensity enhancing element 100 is provided to modify the panel output for vehicle lighting functions. At least one layer of the lighting panel 32 may be an aesthetic layer selected for aesthetic appeal in an unlit state, and is visible from the light emitting side 32e of the lighting panel in an unlit state. Example aesthetic layers provide a desired unlit appearance in accordance with color, texture, shape, gloss or other desired characteristics are disclosed in U.S. patent application Ser. No. 15/217,703 filed on Jul. 22, 2016, the entire contents of which is incorporated herein by reference.

In the embodiment of FIG. 3, the light enhancing element 100 is provided on a light output side 32e of the panel 32 and shown as a discrete layer. However, the light enhancing element 100 may be an integral part of the fiber layer 34 and or the reflection layer.

Figure 4A:
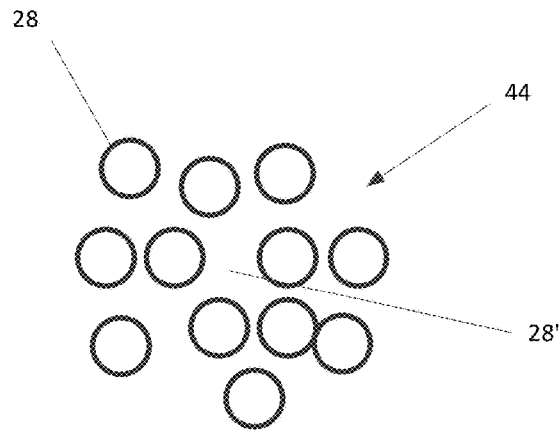
FIGS. 4A and 4B show alternative embodiments of a fiber bundle used in a lighting device according to an exemplary aspect of the disclosure.
Figure 4B:
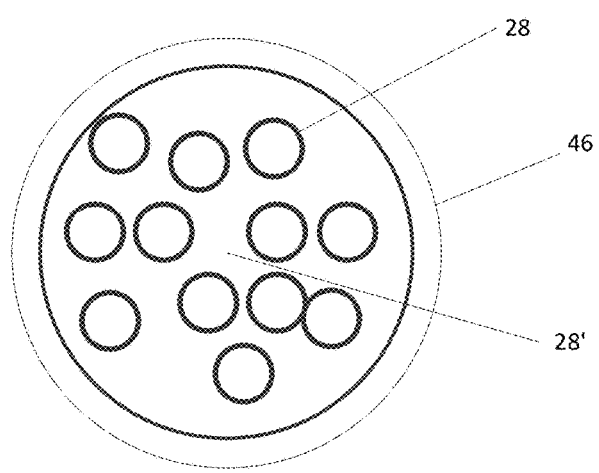

Returning to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape. FIGS. 4A and 4B show alternative embodiments of a fiber bundle 44 and bundling elements used in a lighting system in accordance with embodiments of the invention. As seen in FIG. 4A, the fiber bundle 44 may be maintained by adhesive 28' provided between the fibers 28 as the bundling element to bond the fibers together. Alternatively, the fiber bundle 44 may be maintained by a coupling, 46 (such as a ferrule) as shown in FIG. 4B. The bundle 44 may also include a wrap, sleeve, adhesive, tape, resin or the like to facilitate holding the fibers 28 in the bundled position.

The present inventors have recognized that fiber optic panels, such as those described in US 2018/0017227 may still have uneven light output intensity across the area of the panel because of the fiber bundle 44. Any gaps between individual fiber strands in the fiber bundle 44 leak light. The gaps may consist of air or adhesive.

Figure 5:
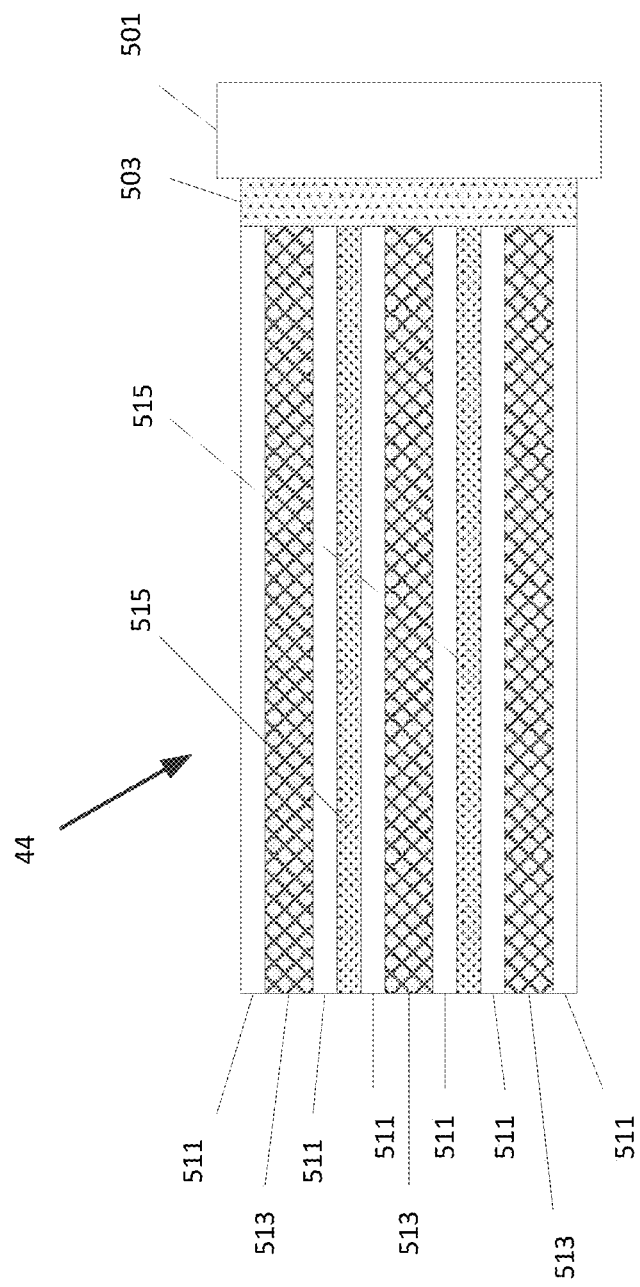
FIG. 5 is a cross-sectional view of an optical fiber panel according to an exemplary aspect of the disclosure.

As a solution, to hold the optical fibers together in a bundle but project light homogeneously into the bundle without leakage of light, the optical fibers may be held together in a bundle by an adhesive that has the same refractive index as the cladding. The adhesive is preferably formed so that it does not extend beyond the end of the optical fiber bundle. Adhesive that extends beyond the end of the bundle may interfere with the light projected into the optical fibers. Another adhesive that has a same refractive index as the core refractive index may be used to attach the end of the bundle to the light source. FIG. 5 is a planar view of the fiber bundle according to an exemplary aspect of the disclosure. Optical fibers consisting of a fiber core 513 that is completely surrounded by fiber cladding 511 are glued with a first adhesive 515. The amount of adhesive used to hold together optical fibers should be an amount that is sufficient to bond outer fiber claddings 511 of optical fibers together and without an air gap. Although the optical fibers are shown with a core 513 and a cladding 511, the individual optical fibers may be conventional optical fibers that include a buffer layer, as well as a jacket. In such case, the adhesive 515 that holds together the optical fibers may be made of a material that has the same refractive index as the outer-most layer of each optical fiber.

Figure 6:
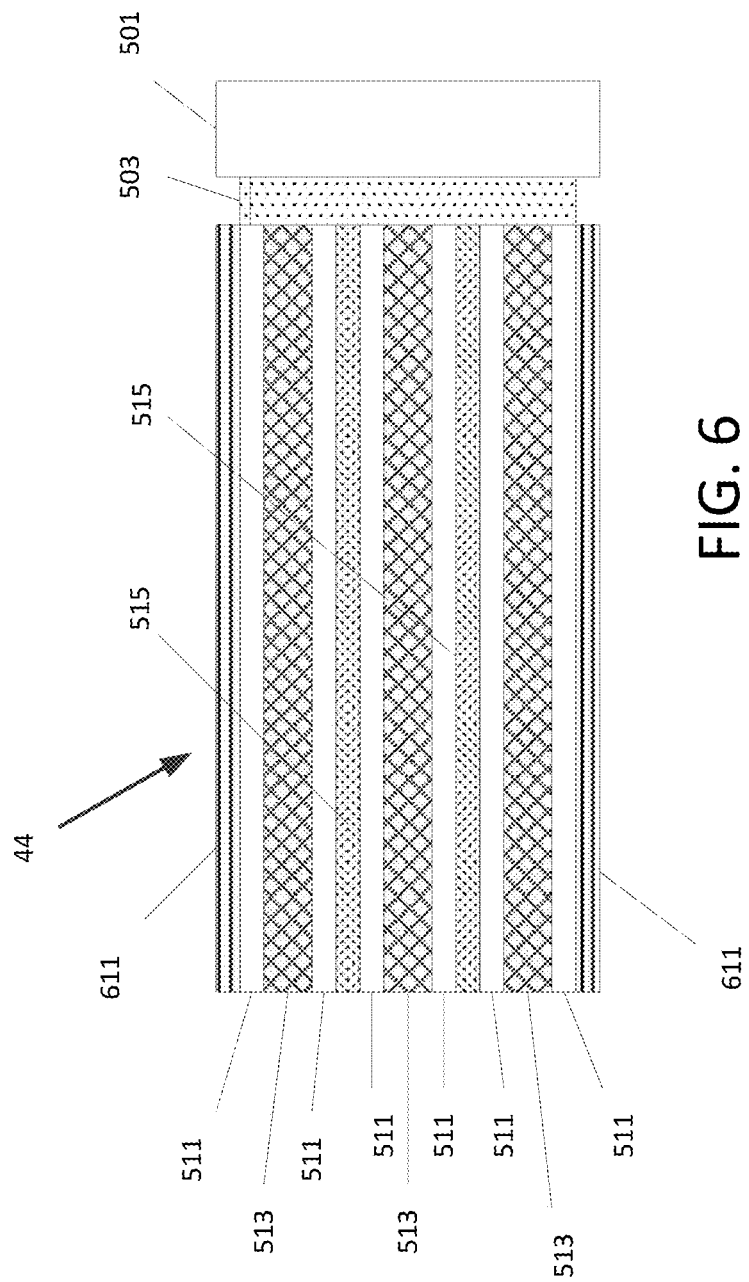
FIG. 6 is a planar view of another fiber bundle according to an exemplary aspect of the disclosure.

FIG. 6 is a planar view of another fiber bundle according to an exemplary aspect of the disclosure. In some embodiments, at least a portion of the glued fiber bundle may be enclosed in a coupler 611, such as a ferrule, and may include a wrap, sleeve, tape, resin or the like to facilitate holding the fibers in a fixed position. The coupler 611 may have reflection properties to ensure that no light escapes outside of the bundle 44. Also, the coupler 611 may serve as a buffer to protect the fiber bundle from the outside environment including extraneous light signals.

Optical fibers may be glass or plastic (polymers). Cores of glass optical fibers may be made of pure glass (silica or silicon dioxide), with very small impurities to adjust the refractive index. The refractive index of pure glass is 1.5. In contrast, the refractive index of air is 1.0. Typically, cladding materials have a refractive index that is about 1% lower than the refractive index of the core so that the critical angle is about 82°. In the case of glass optical fibers in which the core is glass, the cladding material may also be a glass having a lower refractive index than the core material. Provided a core of pure glass, a suitable cladding material would have a refractive index of 1.48. A known cladding material, OF-136, has a low refractive index of 1.37.

Plastic optical fibers include a core of polymer having high transparency such as polystyrene, polymethyl methacrylate (PMMA) and derivatives thereof, glass, and silicone based materials. These polymer cores have refractive indices of about 1.49 and 1.59, respectively. The fiber cladding is typically made of silicone resin having a refractive index of about 1.46.

Typical epoxies have refractive indexes ranging from 1.5 to 1.57. However, low refractive index optical adhesives coating resins are available, in a range of 1.31 to 1.5. (See various adhesives by MyPolymers.) Thus, in the case of cores made of silica or silicon dioxide, the refractive index of the core may be elevated to about 1.52, and the cladding material may be glass that is more pure than the core. A known UV cured adhesive has a refractive index of 1.55. (See Masterbond® UV15-7.). In such case, the refractive index of the cladding material may be a glass with an additive to increase the refractive index to 1.55. The refractive index of the core may be elevated to about 1.58.

In order to assemble optical fibers into bundles according to an exemplary aspect of the disclosure, the optical fibers are preferably glued using an adhesive 515 having the refractive index of the cladding 511 so that there are no air gaps. Once the adhesive 515 is cured, the end of the bundle is cut to remove all adhesive at the exposed end and obtain a flat end. In some embodiments, the end of the cut bundle may be polished to ensure a clear entrance for light. A second adhesive 503 may be applied to glue the end of the fiber bundle to the light source 501. It is preferred that the second adhesive 503 have a refractive index that is the same as the refractive index of the fiber core 513.

Glass optical fibers generally have a core diameter in a range of 10 to 600 microns, and a cladding thickness in a range of 125 to 630 microns. Plastic optical fibers generally range in diameter between 750 and 2000 microns. Thus, plastic optical fibers are generally larger than glass optical fibers.

Figure 7:
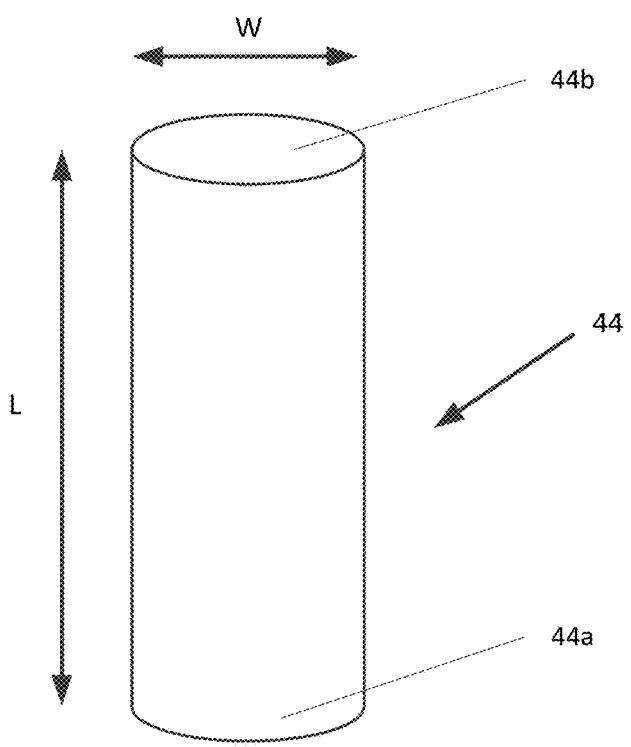
FIG. 7 is a view of overall dimensions of the glued fiber bundle according to an exemplary aspect of the disclosure.

FIG. 7 is a view of overall dimensions of the glued fiber bundle according to an exemplary aspect of the disclosure. First end surface 44a of the glued fiber bundle may be the same sized area or a different sized area than a light emitting surface of light source 501. Further, the first end surface 44a may be parallel or non-parallel with the light emitting face of the light source 501. For example, parallel to the primary exit face of an LED used as light source 501. According to one embodiment, the second end surface 44b of the glued fiber bundle may also be parallel to the primary emitting plane of light source 20. Other optical components can also be added between light source 501 and the glued fiber bundle 44 to enhance optical characteristics of the optical system.

Size and shape of the glued fiber bundle are selected to meet the desired mixing and coupling characteristics. For example, a length L of the glued fiber bundle can generally be increased to effect more TIR reflections and greater spatial uniformity of light output from the glued fiber bundle, while not presenting unacceptable losses to the optical system. In one embodiment, the length of the glued fiber bundle is 20-40 mm. The ratio of glued length (L) to glued fiber bundle diameter is preferably greater than 3.3:1. For example, the glued fiber bundle is preferably 4 mm in diameter and at least 15 mm in length. In some embodiments, individual fibers may be large, such as on the order of 8 mm in diameter.

The arrangement in which a fiber bundle is glued together with an adhesive 515 having a refractive index of the cladding 511 eliminates the need to include an additional light mixer element. The glued fiber bundle itself serves as a mixer and because there are no air gaps, the fiber bundle does not have light leakage. By gluing an end of the fiber bundle to the light source, losses due to interferences with air are eliminated as well.

Figure 8:
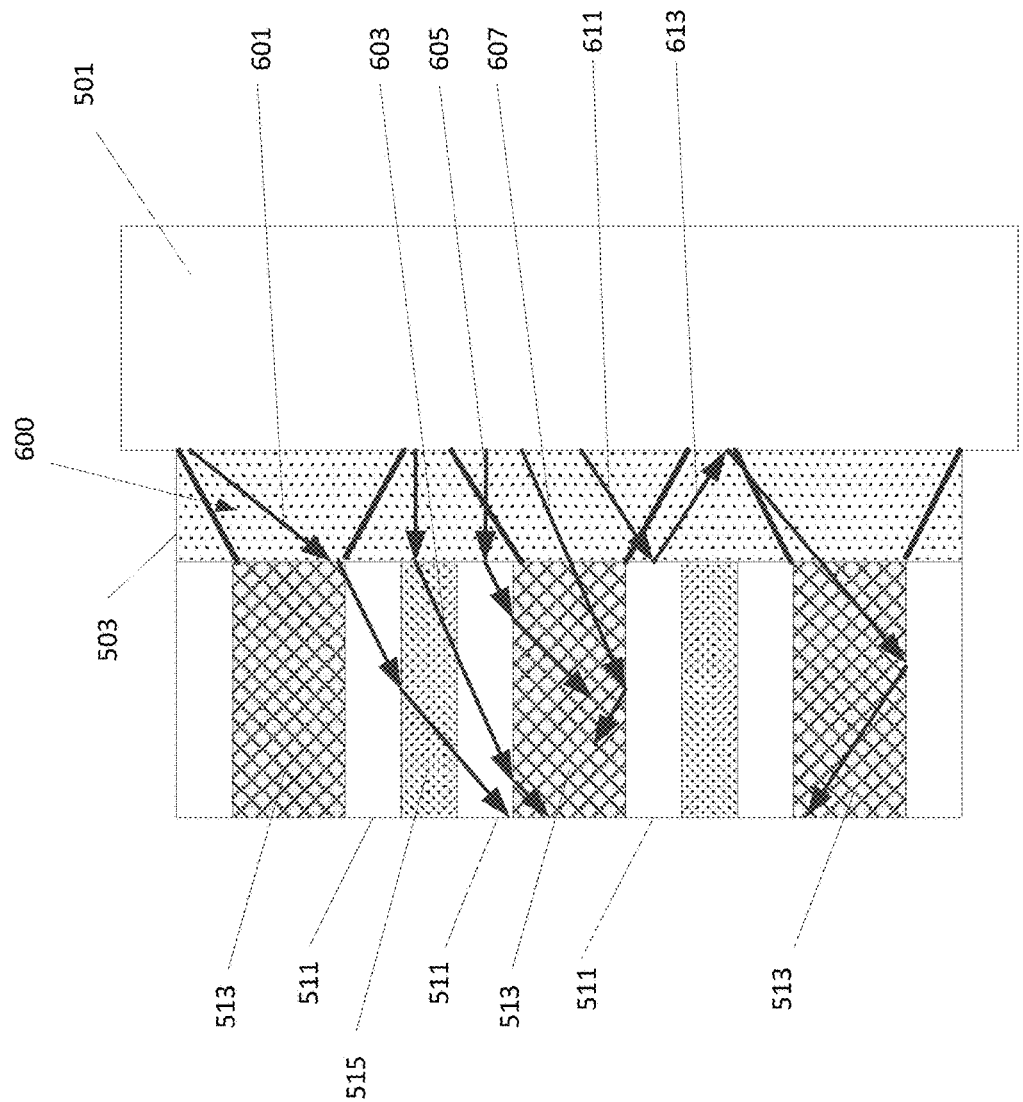
FIG. 8 is a planar view of a glued fiber bundle and light source showing details of light transmission according to an exemplary aspect of the disclosure.

FIG. 8 is a planar view of a glued fiber bundle and light source showing details of light transmission according to an exemplary aspect of the disclosure. An adhesive 503 having a refractive index that is the same as the core 513 may be used to bind the light source 501 to the optical fiber bundle. An adhesive 515 may bind optical fibers into a bundle. The adhesive 515 has a refractive index that is the same as the cladding 511. The light source 501 has been found to produce a radiation pattern having spatial intensity variations. Light must fall inside an acceptance angle 600 to be guided in the core 513 of an optical fiber. By using an adhesive 503 having the same refractive index as the core 513, light 607 that is guided into an end of the core 513 is not refracted and may travel in the core 513 by total internal reflection. Because the adhesive 503 has the same refractive index as the core 513, light that hits the end of the cladding 511 will be refracted. In some cases, light radiation 601 may enter in one fiber and decouple and then go into another fiber. Decoupling of light radiation may be from local scatter or just exiting. In some cases, depending on the angle of the light at the end of the cladding 511, light radiation 611 may be reflected before finally being guided into the core 513. In other cases, light radiation 605 may be refracted upon entering the cladding 511, and enter the core 513. Because the adhesive 515 has the same refractive index as the cladding 511, light radiation 603 may be refracted upon entering the end of the adhesive 515, then pass through to the cladding 511 and entering the core 513. As a result, light radiation from the light source 501 will mix as it travels through the fiber bundle so that light output from the fiber bundle has greater spatial uniformity than that of the input light from the light source 501.

In other embodiments, the individual optical fibers in the bundle may include a buffer layer. In such case, light radiation from the light source 501 may be completely reflected by the buffer layer before being guided in the core of an optical fiber.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An optical fiber bundle assembly, comprising:
a light source generating a radiation pattern having spatial intensity variations;
a bundled plurality of optical fibers, each fiber having a core surrounded by a transparent cladding material with a lower index of refraction than the core;
a first adhesive binding the plurality of optical fibers into the bundle and having an end adjacent to an end of the optical fibers; and
a second adhesive, having a refractive index that is substantially the same as that of the core and different than that of the first adhesive, applied to the end of the optical fibers and the end of the first adhesive,
wherein the radiation pattern is transmitted through the second adhesive to the end of the optical fibers by total internal reflection, and
wherein the refractive index of the first adhesive and the refractive index of the second adhesive are such that a portion of the radiation pattern is reflected by the ends of the cladding and the first adhesive before being guided to the cores of the optical fibers, a portion of the radiation pattern is refracted at the ends of the cladding and the first adhesive, and a portion of the radiation pattern that enters one core of the optical fibers is decoupled and enters into another core within the bundled optical fibers, to an extent that a radiation pattern output from the bundled optical fibers is spatially uniform and the output radiation pattern has spatial uniformity that is greater than that of the radiation pattern generated by the light source.

2. The optical fiber bundle assembly of claim 1, wherein the first adhesive has a refractive index that is substantially the same as that of the cladding.

3. The optical fiber bundle assembly of claim 1, further comprising an end part,
wherein the light source is glued to the end of the optical fibers with the second adhesive.

4. The optical fiber bundle assembly of claim 1, further comprising a coupler that surrounds the plurality of optical fibers.

5. The optical fiber bundle assembly of claim 1, wherein the refractive index of the first adhesive is at least 1.55.

6. An optical fiber light emitting diode assembly, comprising:
an array of optical fibers that converge to a bundled portion, each optical fiber having a core surrounded by a transparent cladding material with a lower index of refraction than the core;
a first adhesive binding the optical fibers in the bundled portion, an end of the first adhesive being adjacent to an end of the optical fibers;
a second adhesive, having a different refractive index than that of the first adhesive, applied to the end of the optical fibers and the end of the first adhesive;
an end part mounted to the second adhesive; and
a light emitting diode applying light in a radiation pattern into the end part,
wherein the radiation pattern is transmitted through the second adhesive to the end of the optical fibers by total internal reflection, and wherein the refractive index of the first adhesive and the refractive index of the second adhesive are such that a portion of the radiation pattern is reflected by the ends of the cladding and the first adhesive before being guided to the cores of the optical fibers, a portion of the radiation pattern is refracted at the ends of the cladding and the first adhesive, and a portion of the radiation pattern that enters one core of the optical fibers is decoupled and enters into another core within the bundled optical fibers, to an extent that a radiation pattern output from the bundled optical fibers is spatially uniform and the output radiation pattern has spatial uniformity that is greater than that of the radiation pattern generated by the light source.

7. The optical fiber bundle assembly of claim 6, wherein the first adhesive has a refractive index that is substantially the same as that of the cladding.

8. The optical fiber bundle assembly of claim 6, wherein the second adhesive has a refractive index that is substantially the same as that of the core.

9. An optical fiber light emitting diode assembly, comprising:

an array of optical fibers that converge to a bundled portion, each optical fiber having a core surrounded by a transparent cladding material with a lower index of refraction than the core;

a first adhesive binding the optical fibers in the bundled portion, an end of the first adhesive being adjacent to an end of the optical fibers;

a second adhesive, having a different refractive index than that of the first adhesive, applied to the end of the optical fibers and the end of the first adhesive; and a light emitting diode applying light in a radiation pattern into the end of the optical fibers, the second adhesive binding the light emitting diode to the end of the optical fibers, wherein the radiation pattern is transmitted through the second adhesive to the end of the optical fibers by total internal reflection, and wherein the refractive index of the first adhesive and the refractive index of the second adhesive are such that a portion of the radiation pattern is reflected by the ends of the cladding and the first adhesive before being guided to the cores of the optical fibers, a portion of the radiation pattern is refracted at the ends of the cladding and the first adhesive, and a portion of the radiation pattern that enters one core of the optical fibers is decoupled and enters into another core within the bundled optical fibers, to an extent that a radiation pattern output from the bundled optical fibers is spatially uniform and the output radiation pattern has spatial uniformity that is greater than that of the radiation pattern generated by the light source.

* * * * *